(12) United States Patent
Liu

(10) Patent No.: US 6,400,867 B1
(45) Date of Patent: Jun. 4, 2002

(54) METHOD AND CONFIGURATION FOR PROVIDING SEAMLESS ANGULAR ADJUSTMENT AND ATTACHMENT TO MAKE STABLE DUAL FIBER OPTICAL COMPONENTS

(75) Inventor: Zhimin Liu, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 13 days.

(21) Appl. No.: 09/704,114

(22) Filed: Oct. 30, 2000

Related U.S. Application Data

(60) Provisional application No. 60/162,033, filed on Oct. 28, 1999.

(51) Int. Cl.⁷ .................................................. G02B 6/32
(52) U.S. Cl. .................................. 385/33; 34/60; 34/72
(58) Field of Search .............................. 385/33, 34, 88, 385/24, 39, 60, 72

(56) References Cited

U.S. PATENT DOCUMENTS 6,246,813 B1 * 6/2001 Zheng .......................... 385/34
6,282,339 B1 * 8/2001 Zheng .......................... 385/34

* cited by examiner

*Primary Examiner*—Phan T. H. Palmer
(74) *Attorney, Agent, or Firm*—Fish & Richardson, P.C.

(57) ABSTRACT

This invention discloses a dual fiber optical component that includes a first holding tube for containing and holding a dual fiber capillary and a collimator lens. The dual fiber capillary has first optical fiber and a second optical fiber with the first optical fiber transmits an input light beam for projecting through the collimator lens as a collimated beam. The dual fiber component further includes a second holding tube containing and holding an optical filter for receiving the collimated beam from the collimator lens. The filter further projecting a portion of the collimated beam back through the collimator lens for transmitting to the second optical fiber of the dual fiber capillary. The first holding tube has a first interface tube end forming with a convex spherical profile and the second holding tube has a second interface tube end forming with a concave spherical profile corresponding to the convex spherical profile of the first interface tube end.

12 Claims, 1 Drawing Sheet

METHOD AND CONFIGURATION FOR PROVIDING SEAMLESS ANGULAR ADJUSTMENT AND ATTACHMENT TO MAKE STABLE DUAL FIBER OPTICAL COMPONENTS

This formal application claims a Priority Date of Oct. 28, 1999 benefited from a Provisional Application 60/162,033 filed by the same Applicant of this Application on Oct. 28, 1999.

FIELD OF THE INVENTION

The present invention relates generally to a signal transmission system implemented with optical fibers and related optical components. More particularly, this invention relates to a method and configuration for seamless adjustment and attachment in the process of making stable dual fiber optical components.

BACKGROUND OF THE INVENTION

Fine tuning of optical components with angular movements of different parts for optical alignment is a time consuming and difficult task in the process of manufacturing and assembling the optical components comprise several optical parts. Furthermore, stability of attachment between these different parts after completion of the alignment operation is also required to assure long-term reliability to implement these optical components on optical fiber signal transmission systems. The difficulties often arise from the requirements of achieving a very secure attachment and meantime highly precise alignment. On the one hand, the alignment operation often affects the interface configuration between several parts, e.g., changes of the gap distance, angular orientations, etc. On the other hand, an operation of applying epoxy for attachment often changes the gap distance or even the angular orientations, thus degrading the precision of optical alignment. The degradation most come from the epoxy curing process and additionally, the thermal effect of epoxy layer is poor due to the poor thickness uniformity caused by the tilt orientation of the elements. The interference between these production processes adversely affects the environmental stability of a fiber optical component. Such problems are more pronounced for wavelength division multiplex (WDM) components manufactured with hybrid configurations combining different optical parts such as filters, collimators, fiber pigtails, etc. Particularly these components are now manufactured with reduced size while demand high alignment precision with stringent environmental stability requirements. Optical components manufactured with conventional technologies often cannot satisfy these requirements due to the limitations of existing assembly technologies.

One specific example is the dual fiber collimator commonly used in many different WDM fiber optic devices and hybrid components. The devices normally include a functional filter of thin film that is placed in front of a GRIN (gradient index) lens and a dual fiber capillary containing two optical fibers is placed behind the GRIN lens. There is no holding tube is used to hold these optical parts together since the capillary and the GRIN lens are not in the same line. The capillary needs to be adjusted in both position and angle to let a second fiber receive a reflected light beam incident from a first fiber by implementing a filter to reflect the light beam incident from the first optical fiber. The light transmitted to the first optical fiber passes through a GRIN lens to become a collimated beam with a portion of the beam reflected back to the second optical fiber by filter attached on the GRIN lens front surface and another portion transmitted through the filter. For the purpose of assembling such an optical component, epoxy is often applied throughout the optical surface between the GRIN lens and the capillary. The optical component is stable and highly reliable but the drawback is that the epoxy is spread onto the optical surface that may cause some problems of degradation of epoxy exposure under laser for long time. Another technology is to apply epoxy into partial area between the GRIN lens and the glass capillary to prevent the epoxy spreading over the optical paths. However, such components are less environmentally stable and problems associated with structure degradation may occur to adversely affect the reliability and performance of operation. Many attempts were made to solve the problem, one method is to firmly fix the GRIN lens and capillary in tube, then adjust the orientation of the filter. After the adjustment finished, epoxy is applied to fix the filter on the GRIN lens surface. The components made in such method are not stable also because the epoxy layer is not uniform due to the filter being tilted. In this invention, a method is disclosed to firmly fix the filter before the GRIN lens with uniform and tiny gap.

Therefore, a need still exits in the art of design and manufacture of fiber optical components assembled with several optical elements such as filter and collimator to provide new configurations and method of manufacturing and assembling methods such that these difficulties can be resolved. Preferably, the new configuration and method of manufacturing can be applied to enhance and improve current manufacturing processes to achieve higher production quality and meanwhile achieve lower production cost of optical components.

SUMMARY OF THE PRESENT INVENTION

It is therefore an object of the present invention to provide an improved configuration and method for manufacturing the optical components by providing angular freedom of movement at the interface between optical parts to seamlessly and continuously perform orientation adjustment such that above difficulties and problems are resolved.

Specifically, it is an object of the present invention to provide an improved configuration and method for manufacturing the optical component by providing spherical tube end interface configuration to allow for angular movement freedom and to provide sufficient areas of attachment by applying the epoxy. The new and improved configuration and method enhance the manufacture process and provide stable attachment between the interface surface areas such that the optical components are made with long-term structure reliability. The epoxy is prevented from spreading over the optical path because the surface tension between the epoxy and the surface are of the tube ends keep the epoxy from entering into the inner parts of the holding tubes.

Briefly, in a preferred embodiment, the present invention includes a dual fiber optical component that includes a first holding tube for containing and holding a dual fiber capillary and a collimator lens. The dual fiber capillary has first optical fiber and a second optical fiber with the first optical fiber receives an input light beam for projecting through the collimating lens as a collimated beam. The dual fiber component further includes a second holding tube containing and holding an optical filter for receiving the collimated beam from the collimating lens. The filter further reflects a portion of the collimated beam back through the collimator lens to transmit to the second optical fiber of the dual-fiber capillary. The first holding tube has a first interface tube end forming with a convex spherical profile and the second holding tube has a second interface tube end forming with a concave spherical profile corresponding to the convex spherical profile of the first interface tube end. The first interface tube-end and the second interface tube-end can seamless fit together to have a multiple dimensional freedom of angular movement for adjusting a relative orientation of the first holding tube to the second holding tube.

In summary, this invention discloses a method of manufacturing and assembling an optical component comprising at least a first and a second optical element. The method includes a step of providing a first interface nonlinear profile for a first optical part. The method further includes a step of providing a second non-linear profile for the second optical component. The second non-linear interface profile is conjugated to the first non-linear interface profile such that the first optical element and the second optical element can seamlessly fit together and having a multiple dimensional freedom of angular movement relative to each other.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
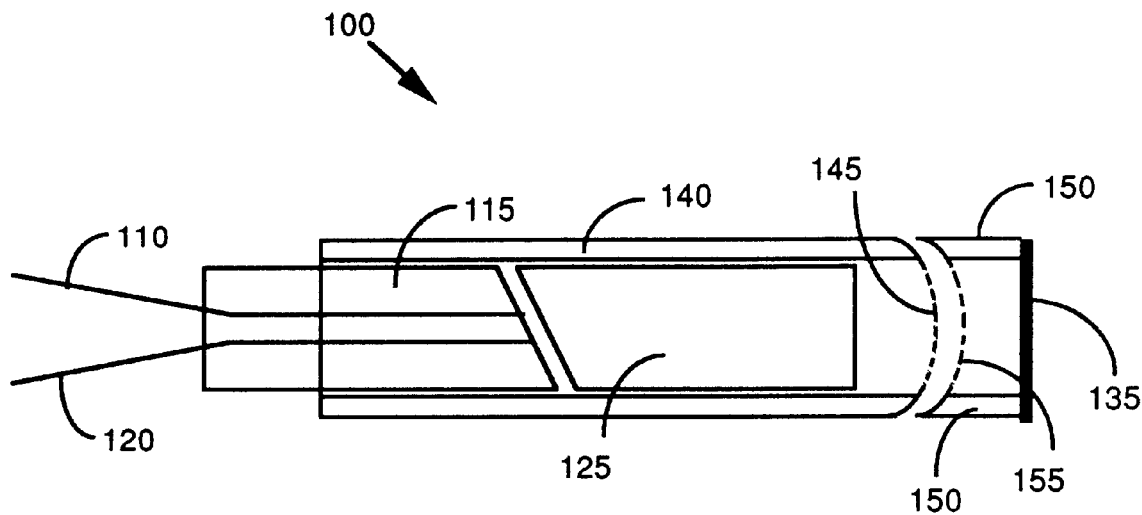
FIG. 1 is a cross sectional view of a reflection type of dual fiber optical component implemented with specially interface configuration providing freedom of interface angular movement.

Referring to FIG. 1 for a cross sectional view of a dual fiber optical component 100 manufactured with a new and improved configuration of this invention. The dual fiber optical component 100 shown is a reflection type dual fiber optical component commonly used in an optical signal transmission system. The dual fiber optical component 100 receives an incoming optical signal from a first optical fiber 110 contained and supported in a dual fiber capillary 115 that also contains and supports a second optical fiber 120. The incoming signal transmitted through the first optical fiber 110 is received by a collimator lens 125, e.g., a GRIN lens, where it is collimated with an outgoing angle relative to the optical axis 130 (see FIG. 2 below). The collimated light is then projected to filter 135. A portion of the light is reflected back by the filter 135, and the reflected portion of the light passes through the collimating lens 125 and then received by the second optical fiber 120. The remaining portion of the light passes through the filter 135 as a second output from the dual fiber component that may be received by another collimator (not shown). For the purpose of producing the reflected and transmitted output signal as described above, the filter 135 must be tuned to according to the incident angle of the beam transmitted from the first optical fiber 110 and the position of the second optical fiber 120 for receiving the reflected beam. The dual optical fiber component 100 is manufactured with special configuration as described below to enhance the fine tuning operation of the relative position and orientation between the filter 135 and the GRIN lens and dual fiber capillary.

The dual fiber capillary 115 and the GRIN lens 125 are contained and securely held by a specially configured holding tube, e.g., a glass tube 140 that has a tube-end 145 polished into a convex spherical shape with radius R. The filter 135 is firmly attached to a second glass tube 150 that has a specially configured concave end spherical surface 155 with a radius R. The concave tube-end 155 can therefore fit and seamlessly interface with the convex spherical tube-end 145 of the first holding tube 140. For the purpose of fine-tuning the filter orientation, the radius R can be few millimeters depending on the range of the angle of adjustment as will be further discussed below.

Figure 2:
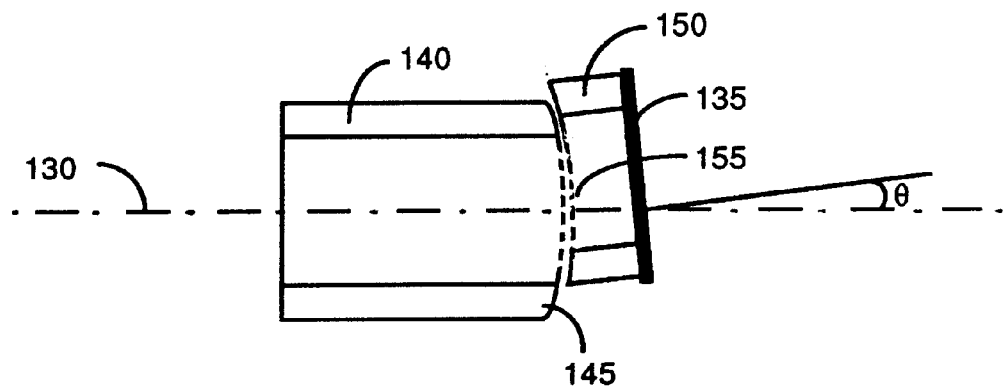
FIG. 2 is a cross sectional view of a relative position of two holding tubes after the completion of angular tuning operation for these two tubes to seamlessly glue together.

Referring to FIG. 2 for an optical fine-tuning operation where the second tube 150 can smoothly glide on the convex spherical tube-end 145 while the second glass tube 150 and the first holding tube 140 are kept in seamless contact. In the meantime, the incline angle θ between the optical axis of the filter 135 and the optical axis 130 of the dual fiber optical component can be smoothly and continuously adjusted. The fine-tuning of the orientation of the filter relative to the optical axis 130 of the dual fiber component can be conveniently performed. Furthermore, after the completion of the fining tuning operation, the second holding tube 150 can be securely attached to the first holding tube 140 by applying optical glue to the interface surface area between the convex tube end 145 and the concave tube-end 155. There are sufficient contact areas and very tiny, uniform gap to securely and permanently fixed the second holding tube 150 to the first holding tube 140 to assure long term reliable operation.

During an assembling operation, a light is transmitted into the first optical fiber 110 and a power meter is connected to the second optical fiber 120 to monitor the optical power reflected back from the filter 135. Then the second tube 150 is continuously gliding on the convex tube end surface 145 until the power meter measures a maximum power. A small amount of epoxy is then applied to the interface between the tube end 145 of the first tube 140 and tube end 155 of the second tube 150 to securely and permanently attached these two holding tubes together. A person of ordinary skill in the art can readily understand that the tube-end of the first holding tube can be made with a concave shape and conversely, the tube-end of the second holding tube can be formed as a convex shape. The interface tube ends of the first and second holding tube are mutually conjugate such that angular adjustment can be continuously executed with total freedom of movement.

According to FIGS. 1 and 2 and above descriptions, this invention discloses a dual fiber optical component. This dual fiber optical component 100 includes a first holding tube 140 for containing and holding a dual fiber capillary 115 and a collimator lens 125. The dual fiber capillary 115 has a first optical fiber 110 and a second optical fiber 120 with the first optical fiber transmitting an input light beam for projecting through the collimating lens 125 as a collimated beam. The fiber optical component further includes a second holding tube 150 containing and holding an optical filter 135 for receiving the collimated beam from the collimator lens 125. The filter 135 further projecting a portion of the collimated beam back through the collimator lens 125 for transmitting to the second optical fiber 120 in the dual fiber capillary 115. The first holding tube 140 has a first interface tube-end 145 forming with a convex spherical profile. The second holding tube 150 has a second interface tube-end forming with a concave spherical profile 155 corresponding to the convex spherical profile 145 of the first interface tube end. The first interface tube-end 145 and the second interface tube-end 155 seamless fit together to have a multiple dimensional freedom of angular movement for adjusting a relative orientation of the first holding tube 140 to the second holding tube 150. In a preferred embodiment, the fiber optical component further includes an epoxy for securely attaching the first tube-end 145 to the second tube-end 155 fitted with the convex profile to the concave spherical profile. In a preferred embodiment, the first holding tube 140 has a first interface tube-end forming with a first angular-adjustable profile 145. And, the second holding tube 150 has a second interface tube-end forming with a second angular-adjustable profile 155 corresponding to the first angular adjustable profile. The second angular-adjustable profile 155 is for fitting and interfacing with the first holding tube to have a freedom of angular adjustable movements. In a preferred embodiment, the first angular-adjustable profile 145 is a convex profile and the second angular-adjustable profile is a corresponding concave profile 155 for seamlessly fitting to the convex profile for allowing the freedom of angular-adjustable movements. In a different embodiment, the first angular-adjustable profile is a concave profile and the second angular-adjustable profile is a corresponding convex profile for seamlessly fitting to the concave profile for allowing the freedom of angular-adjustable movements.

A method of manufacturing and assembling a dual-fiber optical component is also disclosed in this invention. The method includes steps of a) holding a dual fiber capillary 115 and a collimating lens 125 in a first holding tube 140 and holding an optical filter 135 in a second holding tube 150; b) projecting an incoming beam to a first optical fiber 110 of the dual fiber capillary 115 for passing through the collimating lens 125 for collimating into a collimated beam projected to the filter 135 held in the second holding tube 150; c) polishing a first tube-end of the first holding tube next to the second holding tube into a first angular-adjustable profile 145 and polishing a second tube-end of the second holding tube next to the first holding tube into a second angular-adjustable profile conjugated to the first angular adjustable profile 155; d) adjusting the second holding tube 150 relative to the first holding tube 140 with relative angular-adjustable movements between the first angular-adjustable profile 145 interfacing the second angular-adjustable profile 155 and measuring a light reflecting from the filter to a second optical fiber 120 of the dual fiber capillary 125 for obtaining an optimal light measurement for fixing a position of the second holding tube 150 relative to the first holding tube 140.

In summary, this invention discloses a method of manufacturing and assembling an optical component that has at least a first and second optical elements. The method includes steps of a) forming a first interface non-linear profile 145 for the first optical element; b) forming a second non-linear profile 155 for the second optical element wherein the second non-linear interface profile 155 is conjugated to the first non-linear interface profile 145 for seamlessly fitting the first optical element to the second optical element to allow a multiple dimensional freedom of angular movement. The method further includes a step of adjusting an orientation of the second optical element 150 relative to the first optical element 140 by carrying out an angular relative movement along the nonlinear interface profile to achieve an optimal performance characteristic depending on the orientation. The method further includes a step of applying an epoxy for securely attaching the first optical element 150 to the second optical element 140. Using the above method, this invention discloses an optical component comprising at least a first optical element and a second optical element. The first optical element having a first interface non-linear profile 145. The optical element 150 having a second non-linear interface profile 155 wherein the second non-linear interface profile 155 is conjugated to the first non-linear interface profile 145 for seamlessly fitting the first optical element 140 to the second optical element 150 to allow a multiple dimensional freedom of angular movement.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A dual fiber optical component comprising:
    a first holding tube for containing and holding a dual fiber capillary and a collimating lens;
    said dual fiber capillary has a first optical fiber and a second optical fiber with said first optical fiber transmitting an input light beam for projecting through said collimator lens as a collimated beam;
    a second holding tube containing and holding an optical filter for receiving said collimated beam from said collimator lens;
    said filter further projecting a portion of said collimated beam back through said collimating lens for transmitting to said second optical fiber of said dual fiber capillary; and
    said first holding tube has a first interface tube-end forming with a convex spherical profile and said second holding tube has a second interface tube-end forming with a concave spherical profile corresponding to said convex spherical profile of said first interface tube end and said first interface tube-end and said second interface tube-end seamless fitting together to have a multiple dimensional freedom of angular movement for adjusting a relative orientation of said first holding tube to said second holding tube.

2. The dual fiber optical component of claim 1 further comprising:
    an epoxy for securely attaching said first tube-end to said second tube-end fitted with said convex profile to said concave spherical profile.

3. A dual fiber optical component comprising:
    a first holding tube for containing and holding a dual fiber capillary and a collimator lens;
    a second holding tube containing and holding an optical filter for receiving a collimated beam from said collimator lens received from said fiber in dual fiber capillary; and
    said first holding tube has a first interface tube-end forming with a first angular-adjustable profile and said second holding tube has a second interface tube-end forming with a second angular-adjustable profile corresponding to said first angular adjustable profile for fitting and interfacing with said first holding tube to have a freedom of angular adjustable movements.

4. The dual fiber optical component of claim 3 wherein:
    said first angular-adjustable profile is a convex profile and said second angular-adjustable profile is a corresponding concave profile for seamlessly fitting to said convex profile for allowing said freedom of angular-adjustable movements.

5. The dual fiber optical component of claim 3 wherein:
said first angular-adjustable profile is a concave profile and said second angular-adjustable profile is a corresponding convex profile for seamlessly fitting to said concave profile for allowing said freedom of angular-adjustable movements.

6. The dual fiber optical component of claim 3 further comprising:
an epoxy for securely attaching said first tube-end to said second tube-end fitted with said first and second angular-adjustable profiles.

7. A method of manufacturing and assembling a dual-fiber optical component comprising:
holding a dual fiber capillary and a collimating lens in a first holding tube and holding an optical filter in a second holding tube;
projecting an incoming beam to a first optical fiber of said dual fiber capillary for passing through said collimating lens for collimating into a collimated beam projected to said filter held in said second holding tube;
polishing a first tube-end of said first holding tube next to said second holding tube into a first angular-adjustable profile and polishing a second tube-end of said second holding tube next to said first holding tube into a second angular-adjustable profile conjugated to said first angular adjustable profile;
adjusting said second holding tube relative to said first holding tube with relative angular-adjustable movements between said first angular-adjustable profile interfacing said second angular-adjustable profile and measuring a light reflecting from said filter to a second optical fiber of said dual fiber capillary for obtaining an optimal light measurement for fixing a position of said second holding tube relative to said first holding tube.

8. The method of claim 7 further comprising a step of:
applying an epoxy between said first tube-end and said second tube-end for securely attaching said first tube-end to said second tube-end fitted with said convex profile to said concave spherical profile.

9. A method of manufacturing and assembling an optical component, having at least a first and a second optical elements, comprising:
forming a first interface non-linear profile for said first optical element;
forming a second non-linear profile for said second optical element wherein said second non-linear interface profile is conjugated to said first non-linear interface profile for seamlessly fitting said first optical element to said second optical element to allow a multiple dimensional freedom of angular movement.

10. The method of claim 9 further comprising a step of:
adjusting an orientation of said second optical element relative to said first optical element by carrying out an angular relative movement along said non-linear interface profile to achieve an optimal performance characteristic depending on said orientation.

11. The method of claim 9 further comprising a step of:
applying an epoxy for securely attaching said first optical element to said second optical element.

12. An optical component comprising at least a first and a second optical elements, wherein:
said first optical element having a first non-linear interface profile;
said second optical element having a second non-linear profile wherein said second non-linear interface profile is conjugated to said first non-linear interface profile for seamlessly fitting said first optical element to said second optical element to allow a multiple dimensional freedom of angular movement.

* * * * *